US008305357B2

(12) United States Patent
Liao et al.

(10) Patent No.: US 8,305,357 B2
(45) Date of Patent: Nov. 6, 2012

(54) METHOD FOR DETECTING MULTIPLE TOUCH POSITIONS ON A TOUCH PANEL

(75) Inventors: Shih-Chuan Liao, Hsin-Chu (TW); Yu-Min Hsu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 822 days.

(21) Appl. No.: 12/352,727

(22) Filed: Jan. 13, 2009

(65) Prior Publication Data

US 2010/0090976 A1 Apr. 15, 2010

(30) Foreign Application Priority Data

Oct. 9, 2008 (TW) .............................. 97139014 A

(51) Int. Cl.
*G06F 3/045* (2006.01)
(52) U.S. Cl. ........................................ 345/174; 345/173
(58) Field of Classification Search .................. None
See application file for complete search history.

(56) References Cited

U.S. PATENT DOCUMENTS

| 2007/0109280 | A1* | 5/2007 | Sigona | 345/177 |
| 2008/0150906 | A1* | 6/2008 | Grivna | 345/173 |
| 2009/0284495 | A1* | 11/2009 | Geaghan et al. | 345/174 |
| 2010/0073301 | A1* | 3/2010 | Yousefpor et al. | 345/173 |

FOREIGN PATENT DOCUMENTS

WO 2007/138383 A2 12/2007

OTHER PUBLICATIONS

U.S. Appl. No. 61/127,580, filed May 14, 2008.*

* cited by examiner

*Primary Examiner* — Lixi C Simpson
(74) *Attorney, Agent, or Firm* — Chun-Ming Shih

(57) ABSTRACT

A method for detecting multiple touch positions on a touch panel includes the steps of: periodically scanning the touch panel; when detecting a first touch position at a first time during scanning the touch panel, recording coordinates on a first dimensional direction and a second dimensional direction of the first touch position; continuingly scanning the touch panel after the first time; and when detecting a plurality of new possible touch positions at a second time, determining a second touch position from the new possible touch positions according to the recorded coordinates on the first and second dimensional directions of the first touch position.

6 Claims, 3 Drawing Sheets

METHOD FOR DETECTING MULTIPLE TOUCH POSITIONS ON A TOUCH PANEL

CROSS-REFERENCE TO RELATED APPLICATIONS

This application is based upon and claims the benefit of priority from the prior Taiwanese Patent Application No. 097139014, filed Oct. 9, 2008, the entire contents of which are incorporated herein by reference.

BACKGROUND

1. Technical Field

The present invention generally relates to the field of multi-touch technology and, particularly, to a method for detecting multiple touch positions on a touch panel.

2. Description of the Related Art

Touch panels have the advantages of small size, low cost, low power consumption and long life-span, and thus are widely applied on various electronic products as input devices. The user only is required to move or touch an object (e.g., an electrically conductive object such as the user's finger, a stylus or the like) on a touch panel to control a cursor on a window in relative movement or absolute coordinate movement, so that various inputs including text written, window scroll and key press simulation can be performed.

Depending on the type of object used and the manner of touch position is determined, touch panels are generally classifiable as capacitive-type, resistive-type, electromagnetic (EM)-type, surface acoustic wave (SAW)-type and infrared-type touch panels. The capacitive-type touch panel is an input device allowing a user's finger to move on a smooth panel so as to control the movement of the cursor, when the user's finger touches the panel, magnitudes of sensed energy on a first dimensional direction and a second dimensional direction of the touch position are caused to be changed, so that a sensing element can detect whether the capacitive-type touch panel is touched or not according to the magnitudes of sensed energy. Owing to its thin profile, the capacitive-type touch panel is suitably integrated into an ultra-thin notebook, keyboard, digital player or other device. Furthermore, since its non-mechanical design, the capacitive-type touch panel is more easily maintained.

Referring to FIG. 5, a conventional method for detecting multiple (e.g., two) touch positions on a capacitive-type touch panel is difficult to correctly detect the coordinates (A, A), (C, C) of actual touch positions and only can detect a region containing four coordinates (A, A), (C, A), (C, C) and (A, C) is touched. However, the coordinates (C, A) and (A, C) are virtual touch positions (i.e., actually are not touched) rather than the actual touch positions. Therefore, since the accuracy of detect result is limited, may result in the inconvenience of the user and significantly hinder the wide application of the capacitive-type touch panel.

BRIEF SUMMARY

The present invention relates to a method for detecting multiple touch positions on a touch panel which is adapted to correctly detect multiple touch positions.

In order to achieve the above-mentioned advantages, a method for detecting multiple touch positions on a touch panel in accordance with an embodiment of the present invention is provided. The method includes:

(a) periodically scanning the touch panel;

(b) when detecting a first touch position at a first time during scanning the touch panel, recording coordinates on a first dimensional direction and a second second dimensional direction of the first touched position;

(c) continuingly scanning the touch panel after the first time; and (d) when detecting a plurality of new possible touch positions at a second time after the first time, determining a second touch position from the new possible touch positions according to the recorded coordinates on the first and second dimensional directions of the first touch position.

In one embodiment, a time interval between the second time and the first time is no less than one frame scanning time.

In one embodiment, the step of determining the second touch position from the new possible touch positions according to the recorded coordinates on the first and second dimensional directions of the first touch position includes:

(d-1) removing some of the new possible touch positions having a coordinate on the first dimensional direction same as that of the first touch position;

(d-2) removing some of the new possible touch positions having a coordinate on the second dimensional direction same as that of the first touch position; and (d-3) determining the remainder of the new possible touch position as the second touch position.

In one embodiment, the method of detecting multiple touch positions further includes:

(e) continuingly scanning the touch panel after the second time; and (f) when detecting the new possible touch positions are decreased at a third time, confirming the coordinates on the first and second dimensional directions of the first touch position and the second touch position according to disappeared possible touch positions of the new possible touch positions.

In one embodiment, the step of confirming the coordinates on the first and second dimensional directions of the first touch position and the second touch position according to the disappeared possible touch positions of the new possible touch positions includes:

(f-1) acquiring coordinates on the first and second dimensional directions of the respective disappeared possible touch positions;

(f-2) acquiring the coordinate on the first dimensional direction of a first possible touch position of the disappeared possible touch positions and the coordinate on the second dimensional direction of a second possible touch position of the disappeared touch positions, and determining the coordinate on the first dimensional direction of the first possible touch position and the coordinate on the second dimensional direction of the second possible touch position respectively as the coordinates on the first and second dimensional directions of the first touch position; and (f-3) acquiring the coordinate on the second dimensional direction of the first possible touch position and the coordinate on the first dimensional direction of the second possible touch position, and determining the coordinate on the first dimensional direction of the second possible touch position and the coordinate on the second dimensional direction of the first possible touch position respectively as the coordinates on the first and second dimensional directions of the second touch position.

A method for detecting multiple touch positions on a touch panel in accordance with another embodiment of the present invention is provided. The method includes:

(I) periodically scanning the touch panel;

(II) determining a new touch position by using coordinates on a first dimensional direction and a second dimensional direction of at least one current touch position detected before the generation of the new touch position in conjunction with coordinates on the first and second dimensional directions of at least one possible touch position caused by the new touch position on the touch panel.

In one embodiment, the step of determining the new touch position by using the coordinates on the first dimensional direction and the second dimensional direction of the at least one current touch position detected before the generation of the new touch position in conjunction with the coordinates on the first and second dimensional directions of the at least one new possible touch position caused by the new touch position on the touch panel includes:

(II-1) when the at least one current touch position is not existed before the generation of the new touch position:

recording the coordinates on the first and second dimensional directions of the at least one new possible touch position as the coordinates on the first and second dimensional directions of the new touch position; and recording the coordinates on the first and second dimensional directions of the new touched position as coordinates on the first and the second dimensional directions of one current touched position; and (II-2) when the at least one current touched position is existed before the generation of the new touch position:

detecting a plurality of the new possible touch positions resulting from the generation of the new touch position and determining the coordinates on the first and second dimensional directions of the new touch position from the new possible touch positions according to the coordinates on the first and second dimensional directions of the at least one current touch position; and recording the coordinates on the first and second dimensional directions of the new touch position as coordinates on the first and the second dimensional directions of one current touch position.

In one embodiment, the steps of detecting the plurality of new possible touch positions resulting from the generation of the new touch position and determining the coordinates on the first and second dimensional directions of the new touch position from the new possible touch positions according to the coordinates on the first and second dimensional directions of the at least one current touch position includes:

(II-2-1) selecting a particular touch position from the new possible touch positions, wherein a coordinate on the first dimensional direction of the particular touch position is different from that of the at least one current touched position, and a coordinate on the second dimensional direction of the particular touch position is different from that of the at least one current touched position; and (II-2-2) determining the particular touch position as the new touch position.

A method for detecting multiple touch positions on a touch panel in accordance with still another embodiment of the present invention is provided. The method includes:

(1) periodically scanning the touch panel; and (2) determining coordinates on a first dimensional direction and a second dimensional direction of a positioning touch position according to a decreased status of a plurality of possible touch positions, wherein the possible touch positions includes a plurality of actual touch positions and a plurality of virtual touch positions resulting from an inherent characteristic of the touch panel.

In one embodiment, the step of determining the coordinates on the first dimensional direction and the second dimensional direction of the positioning touched position according to the decreased status of the plurality of possible touch positions includes:

(2-1) acquiring coordinates on the first and second dimensional directions of disappeared possible touch positions of the possible touch positions;

(2-2) selecting a particular touch position from the disappeared possible touch positions, wherein the particular touch position and at least one of the other disappeared possible touch positions have the same coordinate on the first dimensional direction, and the particular touch position and at least one of the other disappeared possible touch positions have the same coordinate on the second dimensional direction; and (2-3) determining the coordinates on the first and second dimensional directions of the particular touch position as the coordinates on the first and second dimensional directions of the positioning touch position.

The above-mentioned embodiments of the present invention realize the ability of correctly detecting multiple (e.g., two) touch positions based on the prerequisite of that: when objects (e.g., the user's fingers) touch two positions on a touch panel, from the viewpoint of general humanized operation, touch gestures applied by the objects on the touch panel exists a time interval during the objects touching and/or leaving from the touch panel. Based on the above-mentioned prerequisite, the present invention also can achieve correctly detecting more than two touch positions. Furthermore, since the present method for detecting multiple touch positions can realize correctly detecting more than two touch positions and thus can be employed to detect the touch gestures associated with zoom in, zoom out, rotation or the like.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

An embodiment of the present invention provides a method for detecting multiple touch positions on a touch panel, adapted to correctly detect multiple (i.e., two even more) touch positions. The present method includes the following steps.

Figure 1:
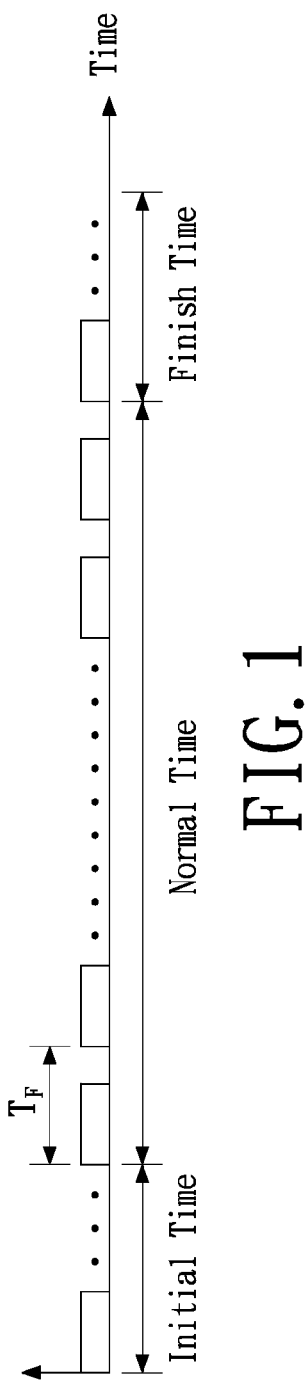
FIG. 1 shows a timing diagram of periodically scanning a touch panel in a method for detecting multiple touch positions, in accordance with an embodiment of the present invention.

Referring to FIG. 1, periodically scanning the capacitive-type touch panel is performed. The $T_F$ represents one frame scanning time. In order to conveniently describe the present method, two touch positions are taken as an example for illustrating the method for detecting multiple touch positions. When the user's fingers touch two positions on the capacitive-type touch panel, from the viewpoint of general humanized operation, touch gestures applied by the user's fingers on the capacitive-type touch panel exist a time interval during the user's fingers touching and/or leaving from the capacitive-type touch panel. If the time interval is not less than one frame scanning time, the ability of correctly detecting multiple touch positions can be achieved. Hereinafter, single two-position touch action is demarcated into three time periods of an initial time, a normal time and a finish time.

First Example

Figure 2:
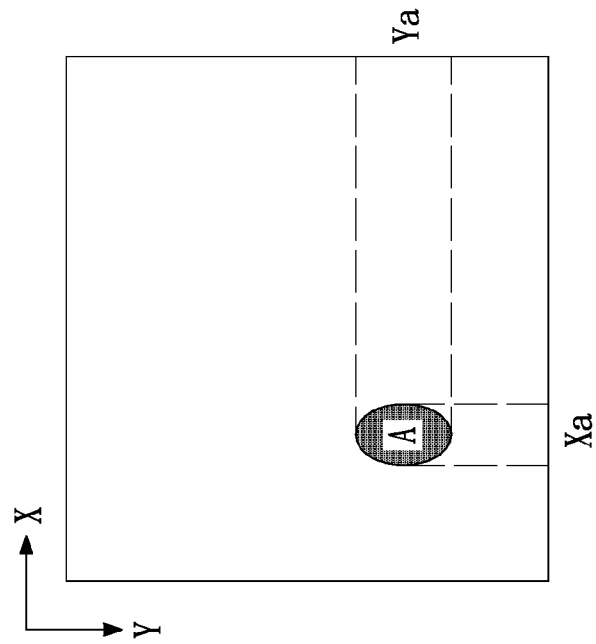
FIG. 2 shows a detected status at an initial time in the method for detecting multiple touch positions, in accordance with the embodiment of the present invention.
Figure 3:
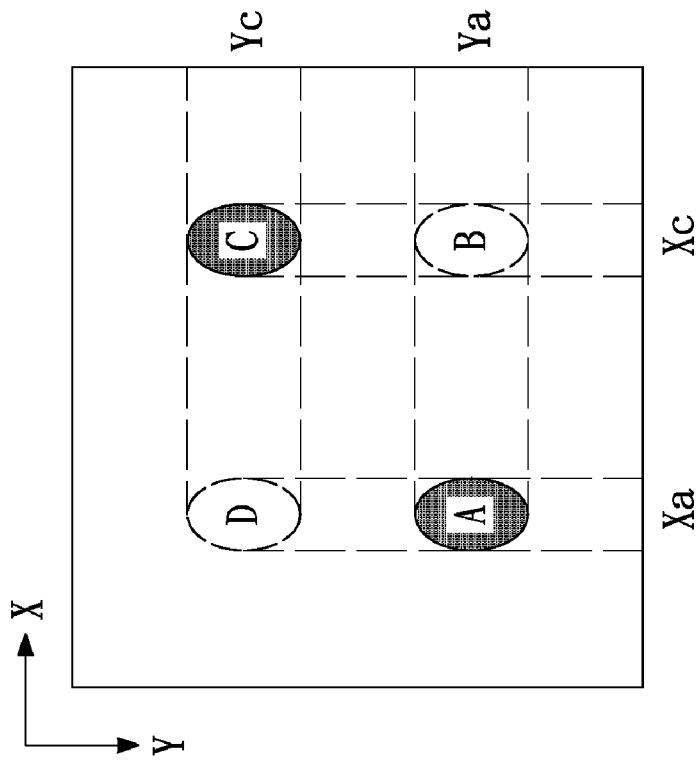
FIG. 3 shows a detected status at a normal time in the method for detecting multiple touch positions, in accordance with the embodiment of the present invention.
Figure 5:
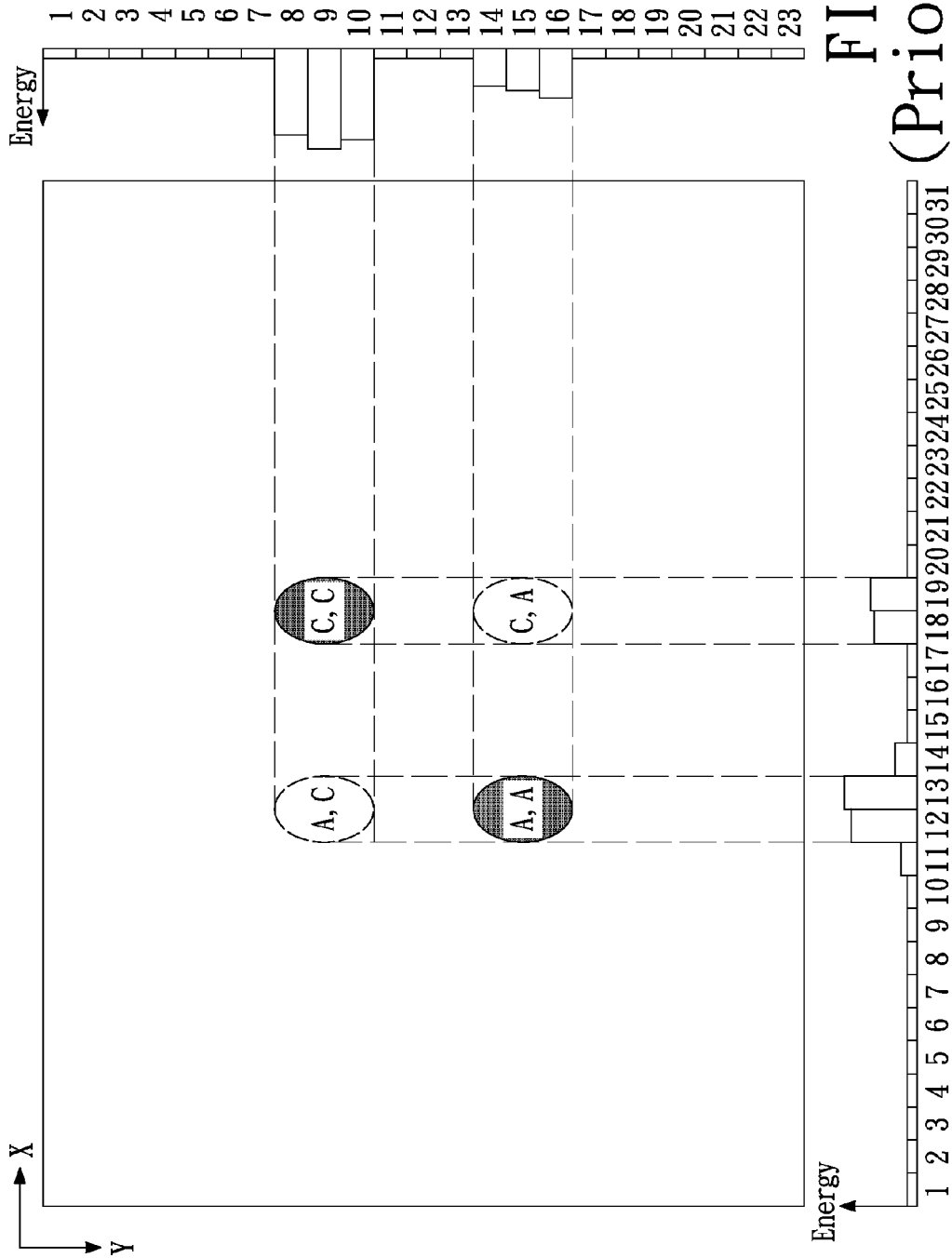
FIG. 5 shows a detected status associated with a capacitive-type touch panel.

Referring to FIGS. 2 and 3, showing a situation that touch gestures applied by the user's fingers on A, C positions exist a time interval during the user's fingers touching the capacitive-type touch panel, As illustrated in FIG. 2, at the initial time, one touch position A is detected, which represents one the user's finger is touching on the capacitive-type touch panel. The coordinate Xa on X-axis direction and the coordinate Ya on Y-axis direction of the touch position A then are recorded. The detecting of the touch position A (Xa, Ya) can be performed by a sensing element (not shown) electrically coupled to the capacitive-type touch panel.

As illustrated in FIG. 3, at the normal time after the initial time, since two the user's fingers are touching on the capacitive-type touch panel, a plurality of possible touch positions A, B, C and D are detected. The possible touch position A has been determined as one actual touch position at the initial time, and the possible touch positions B, C and D are new possible touch positions. The coordinates Xc, Xc, Xa on X-axis direction and the coordinates Ya, Yc, Yc of the respective new possible touch positions B, C and D then are recorded. The detecting of the new possible touch positions B (Xc, Ya), C(Xc, Yc) and D(Xa, Yc) can be performed by the sensing element electrically coupled to the capacitive-type touch panel.

Subsequently, the possible touch position C of the new possible touch positions B, C and D is determined as a new actual touch position according to the recorded coordinates Xa, Ya on X-axis and Y-axis directions of the actual touch position A. The new actual touch position C is a diagonal position relative to the actual touch position A. The coordinates on X-axis and Y-axis directions of the new actual touch position C respectively are different from the coordinates on X-axis and Y-axis directions of the actual touch position A. The new possible touch positions B and D are virtual touch positions resulting from an inherent characteristic of the capacitive-type touch panel. More specifically, the possible touch position C is determined as the new actual touch position from the new possible touch positions B, C and D can include the steps of: (1) removing some of the new possible touch positions B, C and D having a coordinate on X-axis direction same as the coordinate Xa of the actual touch position A, i.e., removing the possible touch position D; (2) removing some of the new possible touch pints B, C and D having a coordinate on Y-axis direction same as the coordinate Ya of the actual touch position A, i.e., removing the possible touch position B; (c) determining the remainder (i.e., possible touch position C) of the new possible touch positions B, C and D as the new actual touch position and the correct detecting of two touch positions A, C is completed as a result.

Second Example

Figure 4:
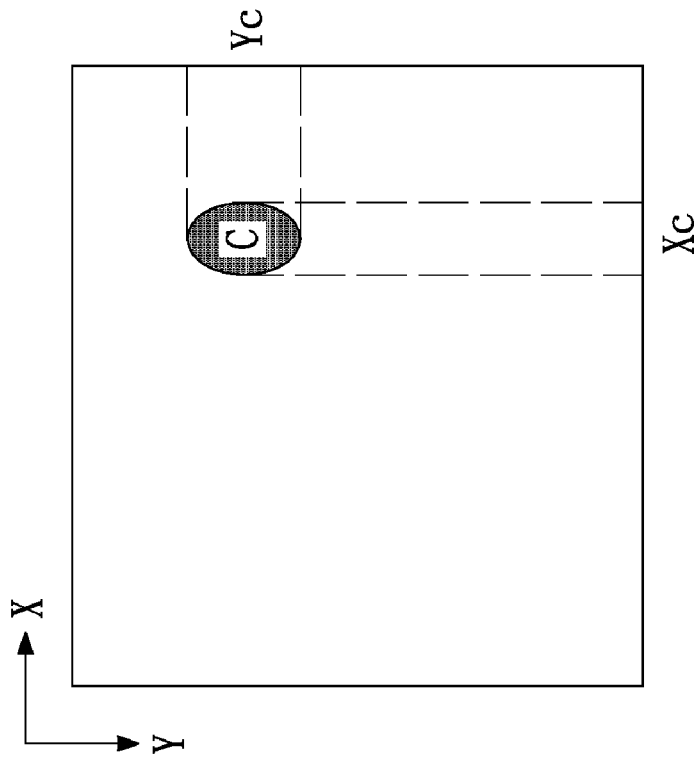
FIG. 4 shows a detected status at a finish time in the method for detecting multiple touch positions, in accordance with the embodiment of the present invention.

Referring to FIGS. 3 and 4, showing a situation that touch gestures applied by the user's fingers on A, C positions exist a time interval during the user's fingers leaving from the capacitive-type touch panel.

As illustrated in FIG. 3, at the normal time, since the two user's fingers are touching on the capacitive-type touch panel, a plurality of possible touch positions A, B, C and D are detected. The coordinates Xa, Xc, Xc, Xa on X-axis direction and the coordinates Ya, Ya, Yc, Yc on Y-axis direction of the respective possible touch positions A, B, C and D then are recorded. The detecting of the possible touch positions A (Xa, Ya), B (Xc, Ya), C (Xc, Yc) and D (Xa, Yc) can be performed by a sensing element (not shown) electrically coupled to the capacitive-type touch panel. The possible touch positions A, B, C and D contain actual touch positions A, C and virtual touch positions B, D. The generation of the virtual touch positions B, D results from the inherent characteristic of the capacitive-type touch panel.

As illustrated in FIG. 4, at the finish time after the normal time, the possible touch positions A, B and D disappears and only the possible touch position C (Xc, Yc) is detected. The remained possible touch position C (Xc, Yc) is an actual touch position. The coordinates Xa and Ya on X-axis and Y-axis directions of a positioning actual touch position A on the capacitive-type touch panel then are determined according to a decreased status of the possible touch positions A, B, C and D. In particular, the determination of the coordinates Xa and Ya of the positioning actual touch position A on the capacitive-type touch panel can include: (I) acquiring the coordinates Xa, Xc, Xa on X-axis direction and the coordinates Ya, Ya, Yc on Y-axis direction of disappeared possible touch positions A, B and D of the possible touch positions A, B, C and D; (II) selecting a particular touch position (i.e., the possible touch position A) from the disappeared possible touch positions A, B and D, the particular touch position A and at least one of the other disappeared possible touch positions B, D (i.e., the disappeared possible touch position D) have the same coordinate on X-axis direction, and the particular touch position A and at least one of the other disappeared possible touch positions B, D (i.e., the disappeared possible touch position B) have the same coordinate on Y-axis direction; and (III) determining the coordinates on X-axis and Y-axis direction of the particular touch position A as the coordinates on X-axis and Y-axis direction of the positioning actual touch position A and the correct detecting of the actual touch positions A, C is completed as a result. The actual touch position A is a diagonal position relative to the actual touch position C.

Third Example

Referring to FIGS. 2 through 4, showing a situation that touch gestures applied by the user's fingers on A, C positions exist a time interval when the fingers touching the capacitive-type touch panel as well as leaving from the capacitive-type touch panel.

As illustrated in FIG. 2, at the initial time, an actual touch position A is detected, which represents one the user's finger is touching on the capacitive-type touch panel. The coordinate Xa on X-axis direction and the coordinate Ya on Y-axis direction of the actual touch position A then is recorded. The detecting of the actual touch position A (Xa, Ya) can be performed by a sensing element (not shown) electrically coupled to the capacitive-type touch panel.

As illustrated in FIG. 3, at the normal time after the initial time, since the two the user's fingers are touching on the capacitive-type touch panel, a plurality of possible touch positions A, B, C and D are detected. The possible touch position A has been determined as one actual touch position at the initial time, and the possible touch positions B, C and D are new possible touch positions. The coordinates Xc, Xc, Xa on X-axis direction and the coordinates Ya, Yc, Yc on Y-axis direction of the respective new possible touch positions B, C and D then are recorded. The detecting of the new possible touch positions B (Xc, Ya), C (Xc, Yc) and D (Xa, Yc) can be performed by the sensing element.

Subsequently, the possible touch position C of the new possible touch positions B, C and D is determined as a new actual touched position according to the recorded coordinates Xa, Ya on X-axis and Y-axis directions of the actual touch position A. The new actual touch position C is a diagonal position relative to the actual touch position A. The coordinates on X-axis and Y-axis directions of the new actual touch position C respectively are different from the coordinates on X-axis and Y-axis of the actual touch position A. The new possible touch positions B and D are virtual touch positions resulting from the inherent characteristic of the capacitive-type touch panel. More specifically, the possible touch position C is determined as the new actual touch position from the new possible touch positions B, C and D can include: (1) removing some of the new possible touch positions B, C and D having a coordinate on X-axis direction same as the coordinate Xa of the actual touch position A, i.e., removing the new possible touch position D; (2) removing some of the new possible touch pints B, C and D having a coordinate on Y-axis direction same as the coordinate Ya of the actual touch position A, i.e., removing the new possible touch position B; (c) determining the remainder (i.e., the possible touch position C) of the new possible touch positions B, C and D as the new actual touch position and the correct detecting of the actual touch positions A, C is completed as a result.

As illustrated in FIG. 4, at the finish time after the normal time, the positions B and D of the new possible touch positions B, C and D are disappeared and only the position C is detected. The coordinates Xa, Xc on X-axis direction and the coordinates Ya, Yc on Y-axis direction of the respective actual touch positions A, C then are confirmed according to the disappeared new possible touch positions B, D. In particular, the confirmation of the coordinates Xa, Xc on X-axis direction and the coordinates Ya, Yc on Y-axis direction of the respective actual touch positions A, C can include: (I) acquiring the coordinates Xc, Xa on X-axis direction and the coordinates Ya, Yc on Y-axis direction of the respective disappeared new possible touch positions B, D; (II) acquiring the coordinate Xa (or Xc) on X-axis direction of a first possible touch position D (or B) and the coordinate Ya (or Yc) on Y-axis direction of a second possible touch position B (or D), and determining the coordinate Xa on X-axis direction of the first possible touch position D and the coordinate Ya on Y-axis direction of the second possible touch position B as the coordinates of the actual touch position A; and (III) acquiring the coordinate Yc (or Ya) on Y-axis direction of the first possible touch position D (or B) and the coordinate Xc on X-axis direction of the second possible touch position B, and determining the coordinate Xc on X-axis direction of the second possible touch position B and the coordinate Yc on Y-axis direction of the first possible touch position D as the coordinates of the actual touch position C and the confirmation of the actual touch positions A, C is completed as a result.

In summary, the methods for detecting multiple touch positions illustrated in the foregoing examples are adapted to correctly detect touch positions on the capacitive-type touch panel, during periodically scanning the capacitive-type touch panel, the coordinates on X-axis direction and Y-axis direction of a current actual touch position detected before the generation of a new actual touch position (e.g., the position A at the initial time or the position C at the normal time) in conjunction with the coordinates on X-axis direction and Y-axis direction of at least one possible touch position caused by the new actual touch position on the capacitive-type touch panel are used to determine the location of the new actual touch position and thus the correct detecting of two actual touch positions can be achieved.

It is indicated that the method for detecting multiple touch positions in accordance with the present invention is not limited to detect two touch positions and also adapted to detect more than two touch positions, as long as the touch gestures applied on the touch positions exist a time interval during touching and/or leaving from the capacitive-type touch panel no less than one frame scanning time. Regarding a method for detecting more than two touch positions is similar to the methods for detecting two touch positions as illustrated in the forgoing examples, and thus will not be repeated herein. Furthermore, since the present method for detecting multiple touch positions can realize the detecting of more than two touch positions and thus has a potential application of detecting the touch gestures associated with zoom in, zoom out, rotation or the like.

In addition, the method for detecting multiple touch positions in accordance with the present invention is not limited to applying to the capacitive-type touch panel, and can be applied to other type touch panel which can generate a plurality of virtual touch positions when multiple positions on the touch panel are touched.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for detecting multiple touch positions on a touch panel, comprising:
   periodically scanning the touch panel;
   detecting a possible touch position at a first time during scanning the touch panel;
   determining the detected possible touch position as a first actual touch position and recording coordinate values of the first actual touch position on a first dimensional direction and a second dimensional direction;
   scanning the touch panel after the first time;
   detecting a plurality of new possible touch positions at a second time after the first time; and
   comparing coordinate values of the detected new possible touch positions with the coordinate values of the first actual touch position on the first dimensional direction and the second dimensional direction to thereby determine a second actual touch position from the new possible touch positions, comprising:
   comparing the coordinate values of the detected new possible touch positions with the coordinate value of the first actual touch position on the first dimensional direction;

comparing the coordinate values of the detected new possible touch positions with the coordinate value of the first actual touch position on the second dimensional direction;
removing some of the new possible touch positions having a coordinate value on the first dimensional direction same as that of the first actual touch position;
removing some of the new possible touch positions having a coordinate value on the second dimensional direction same as that of the first actual touch position; and
determining the remainder of the new possible touch positions as the second actual touch position.

2. The method as claimed in claim 1, further comprising:
scanning the touch panel after the second time; and
when the detected new possible touch positions are decreased, confirming the coordinate values of the first and second actual touch positions on the first and second dimensional directions according to coordinate values of disappeared possible touch positions of the new possible touch positions on the first and second dimensional directions,
wherein the step of confirming the coordinate values of the first and second actual touch positions on the first and second dimensional directions according to coordinate values of disappeared possible touch positions of the new possible touch positions on the first and second dimensional directions comprises:
acquiring coordinate values of the respective disappeared possible touch positions on the first and second dimensional directions;
acquiring the coordinate value of a first possible touch position of the disappeared possible touch positions on the first dimensional direction and the coordinate value of a second possible touch position of the disappeared possible touch positions on the second dimensional direction, and using the coordinate value of the first possible touch position on the first dimensional direction and the coordinate value of the second possible touch position on the second dimensional direction respectively to confirm the coordinate values of the first actual touch position on the first and second dimensional directions; and
acquiring the coordinate value of the first possible touch position on the second dimensional direction and the coordinate value of the second possible touch position on the first dimensional direction, and using the coordinate value of the second possible touch position on the first dimensional direction and the coordinate value of the first possible touch position on the second dimensional direction respectively to confirm the coordinate values of the second actual touch position on the first and second dimensional directions.

3. A method for detecting multiple touch positions on a touch panel, comprising:
periodically scanning the touch panel; and
determining a new possible touch position by comparing coordinate values of at least one new possible touch position on a first dimensional position and a second dimensional position caused by the new actual touch position on the touch panel with coordinate values of at least one current actual touch position on the first and second dimensional directions detected before the generation of the new actual touch position, comprising:
when the at least one current actual touch position is not existed before the generation of the new actual touch position:
recording the coordinate values of the at least one new possible touch position on the first and second dimensional directions as the coordinate values of the new actual touch position on the first and the second dimensional directions; and
recording the coordinate values of the new actual touch position on the first and second dimensional directions as coordinate values of one current actual touch position on the first and second dimensional directions; and
when the at least one current actual touch position is existed before the generation of the new actual touch position:
detecting a plurality of the new possible touch positions resulting from the generation of the new actual touch position, comparing the coordinate values of the detected new possible touch positions with the coordinate values of the at least one current actual touch position on the first and second dimensional directions and determining the coordinate values of the new actual touch position from the new possible touch positions on the first and second dimensional directions; and
recording the coordinate values of the new actual touch position on the first and second dimensional directions as coordinate values of one current actual touch position on the first and second dimensional directions.

4. The method as claimed in claim 3, wherein the step of detecting a plurality of the new possible touch positions resulting from the generation of the new actual touch position, comparing the coordinate values of the detected new possible touch positions with the coordinate values of the at least one current actual touch position on the first and second dimensional directions and determining the coordinate values of the new actual touch position from the new possible touch positions on the first and second dimensional directions comprises:
comparing the coordinate values of the detected new possible touch positions with the coordinate values of the at least one current actual touch position on the first and second dimensional directions;
acquiring a particular touch position from the new possible touch positions, wherein a coordinate value of the particular touch position on the first dimensional direction is different from that of the at least one current actual touch position on the first dimensional direction, a coordinate value of the particular touch position on the second dimensional direction is different from that of the at least one current actual touch position on the second dimensional direction; and
determining the particular touch position as the new actual touch position.

5. A method for detecting multiple touch positions on a touch panel, comprising:
periodically scanning the touch panel;
detecting a decreased status of a plurality of possible touch positions to acquire disappeared possible touch positions from the plurality of possible touch positions, wherein the plurality of possible touch positions comprises a plurality of actual touch positions and a plurality of virtual touch positions resulting from an inherent characteristic of the touch panel;
comparing coordinate values of the disappeared possible touch positions on a first dimensional direction and a second dimensional direction with one another to thereby determine one of the disappeared possible touch positions which has a coordinate value on the first dimensional direction same as that of at least one of the other disappeared possible touch positions and has a coordinate value on the second dimensional direction same as of at least one of the other disappeared possible touch positions as one of the actual touch positions.

6. The method as claimed in claim 5, further comprising:
determining one of the plurality of possible touch positions which is not included in the disappeared possible touch positions as another one of the actual touch positions.

* * * * *